United States Patent
Nagatsuka et al.

(10) Patent No.: US 7,857,203 B2
(45) Date of Patent: *Dec. 28, 2010

(54) SYSTEM FOR WRITING INFORMATION AND METHOD OF WRITING INFORMATION

(75) Inventors: Ikutaroh Nagatsuka, Kanagawa (JP); Yasunori Saito, Kanagawa (JP); Minoru Koshimizu, Kanagawa (JP); Daisuke Tsuda, Tokyo (JP); Tsunemasa Mita, Kanagawa (JP); Tsutomu Ishii, Kanagawa (JP); Kiyoshi Shigehiro, Kanagawa (JP); Takeshi Matsunaga, Kanagawa (JP); Takeo Kakinuma, Kanagawa (JP); Yoshinori Machida, Kanagawa (JP); Yasufumi Suwabe, Kanagawa (JP); Hiroshi Arisawa, Tokyo (JP); Yasunari Nishikata, Kanagawa (JP); Haruo Harada, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/457,490

(22) Filed: Jun. 12, 2009

(65) Prior Publication Data
US 2009/0255985 A1 Oct. 15, 2009

Related U.S. Application Data

(63) Continuation of application No. 10/643,890, filed on Aug. 20, 2003, now Pat. No. 7,578,429.

(30) Foreign Application Priority Data

Aug. 23, 2002 (JP) .............................. 2002-242920
Feb. 24, 2003 (JP) .............................. 2003-045453

(51) Int. Cl.
*G06F 17/00* (2006.01)

(52) U.S. Cl. ..................................................... 235/375
(58) Field of Classification Search ................. 235/375, 235/380, 492; 345/173
See application file for complete search history.

(56) References Cited

U.S. PATENT DOCUMENTS 5,770,843 A 6/1998 Rose et al.
6,016,189 A 1/2000 Ueda (Continued)

FOREIGN PATENT DOCUMENTS

| JP | A-04-097143 | 3/1992 |
| JP | A-06-095058 | 4/1994 |
| JP | A-10-097004 | 4/1998 |
| JP | A-11-078176 | 3/1999 |

(Continued)

*Primary Examiner*—Seung H Lee
(74) *Attorney, Agent, or Firm*—Oliff & Berridge, PLC

(57) ABSTRACT

A medium writing apparatus obtains information to be written onto a recording medium, converts the information into a suitable writable format, and then writes the converted information onto the recording medium. An ID obtaining section obtains a medium ID from the recording medium, or through an input by the user. The medium ID and information indicating the place of the written information are sent to a server, and then stored as index information correlating them with each other. When the information written onto the recording medium is to be used at a later timing, the medium ID is identified, and the index information is obtained from the server. Therefore, the original information can be obtained so as to be easily reprocessed or reused.

2 Claims, 6 Drawing Sheets

| U.S. PATENT DOCUMENTS | | | | FOREIGN PATENT DOCUMENTS | | |
|---|---|---|---|---|---|---|
| 6,070,794 | A | 6/2000 | Niwata et al. | JP | A-11-219481 | 8/1999 |
| 6,494,367 | B1 | 12/2002 | Zacharias | JP | A-2001-301233 | 10/2001 |
| 6,732,919 | B2 | 5/2004 | Macklin et al. | JP | A-2002-203213 | 7/2002 |
| 2002/0095517 | A1 | 7/2002 | Sasaki et al. | JP | A-2002-215490 | 8/2002 |

| MEDIUM ID | URL |
|---|---|
| 12345 | http://www.a.co.jp |
| 98765 | http://www.b.co.jp |
| ... | ... |

| USER ID | URL |
|---------|-----|
| USR456  | http://www.a.co.jp |
| USR864  | http://www.b.co.jp |
| ...     | ... |

| MEDIUM ID | SPECIFYING INFORMATION |
|---|---|
| 12345 | NEWS (SPORTS) |
| 98765 | WEATHER FORECAST (TOKYO) |
| ... | ... |

SYSTEM FOR WRITING INFORMATION AND METHOD OF WRITING INFORMATION

This is a Continuation of application Ser. No. 10/643,890 filed Aug. 20, 2003, which claims priority to Japanese Application No. 2002-242920 filed Aug. 23, 2002 and Japanese Application No. 2003-045453 filed Feb. 24, 2003. The disclosure of the prior applications are hereby incorporated by reference herein in their entirety.

BACKGROUND OF THE INVENTION

1. Field of the Invention

The present invention relates to a system and method of writing information in which a recording medium onto which information is externally writable is used and information is written onto such a recording medium.

2. Description of the Related Art

There are cases where information included in an electronic document such as a text or an image which is viewable on a monitor screen of a computer is used in another place, or reviewed at a later timing, and where such a document is always posted in a prominent place in order to draw attention to the information. In these cases, for example, the information is usually printed onto a paper sheet by a printer with using a printing function of an application software in the computer, or, when the information is simple, it is manually written onto a notebook or a slip of paper.

Such information is widely varied. For example, the information may be fragmentary one containing only necessary data such as a subway or road map to a place to which the user is to visit, or a contact address of a person to whom the user is to meet in a destination. Along with recent popularization of the Internet, various information is distributed on the WWW (World Wide Web) and can be viewed with a Web browser. In such information, there are many fragmentary information pieces such as those described above. In the case where such fragmentary information is a map, a contact address, or like information, it is often that such information becomes no longer required when the user reaches the destination or the business is ended, or is very transient.

Even when necessary information is fragmental and transient and consists of part of information displayed on a monitor screen, printing out of such information must consumes at least whole one sheet. In this case, as compared with document information which is produced on the premise of a long-term use or storage, the resulting printed material is used during a shorter term, and has a smaller printed area ratio or has a larger blank area. Therefore, the paper resource is wastefully consumed. Since information displayed on the screen must be developed into print data for a printer, a prolonged time period is required. Moreover, for example, information on a screen which is divided by complicated frames on a Web browser sometimes fails to be printed in the same manner as that on the screen.

When necessary information is manually written onto a notebook or the like instead of printing out, paper sheets can be prevented from being wastefully consumed. However, manual transcription of information which is not in the form of text data, such as that of a fine map is hardly performed and requires a long time period and much labor.

Image forming techniques which are aimed at reducing the difference between an image on a display screen and a printed image, omitting the printing time, and reducing the size of an apparatus are described in, for example, Patent literatures 1, 2, and 3. The techniques described in the literatures are related to image forming apparatuses which have excellent portability, and in which a photosensitive sheet that is photosensitively colored is in close contact with a display screen such as a liquid crystal display device, and the photosensitive sheet is irradiated with light emitted from the display screen, thereby copying an image onto the sheet. In the image forming techniques, a photosensitive sheet is employed for recording an image. Such a photosensitive sheet is a consumption article which is not reusable. In the same manner as the above-mentioned case where printing is performed on a usual paper sheet, the resource is wastefully consumed for a short time period, thereby producing a problem in that an influence on the environment cannot be eliminated.

In order to solve the problem, a method of copying image information is proposed in Patent literature 4. In the method, a whole or part of image or text information is displayed and recorded as a visible image in the form of an optical pattern on a rewritable recording medium. According to the method, a whole or part of any information displayed on a monitor screen or the like can be copied in real time as image information equivalent to that on the screen onto a displaying recording medium which can be rewritten many times, which has excellent portability, and in which an influence on the environment can be suppressed.

In the image information forming method for an image forming apparatus or the like which is descried in the literature, digital information is once converted into an optical pattern and then recorded, or the information is formed into analog information. When the recorded information is to be processed or used at a later timing, for example, the information must be reconverted into digital data, thereby causing a problem in that such information cannot be easily handled.

In the method, a rewritable medium is used as the displaying and recording medium. When information is erased or other information is written, therefore, the contents which have been displayed cannot be referred. With respect to a paper sheet which is conventionally used, contents which are once printed are hardly erased, and stored as they are, so that they can be referred at a later timing as a result of searching. By contrast, in the displaying recording medium, contents which were previously displayed cannot be referred after a rewriting operation. This problem is caused not only in such a displaying recording medium but also in various rewritable recording media.

SUMMARY OF THE INVENTION

The invention has been conducted in order to solve the above problems. It is an object of the invention to provide a system for writing information in which a whole or part of index arbitrary information can be recorded in real time onto a recording medium that is rewritable many times, and recorded information can be obtained as digital information as required so as to be easily subjected to, for example, reprocessing or reuse.

According to the invention, a recording medium in which information can be externally rewritable, or a user of such a recording medium is previously provided with a medium ID identifying the recording medium or a user ID identifying the user, information is written onto the recording medium, the medium ID or the user ID is obtained, and the medium ID or the user ID and the information written onto the recording medium are correlatively stored as index information. The index information which correlates the medium ID or the user ID with the information written onto the recording medium in this way is stored as the history of writing information onto the recording medium. In response to a request identifying a medium ID or a user ID, a whole or part of index information corresponding to the medium ID or the user ID among the stored index information is returned, and, with using the returned index information, the same information as that which has been written onto the recording medium can be reused or reprocessed.

The index information may be configured so as to include information indicating a place of the information that is written onto the recording medium, or the information itself that is written onto the recording medium. When the medium ID is to be obtained, the ID may be read from the recording medium, or the user may input the ID. When the index information is to be stored, authentication based on the medium ID or the user ID may be performed.

In the invention, a recording medium in which information is externally rewritable is previously provided with a medium ID identifying the recording medium, and index information correlating the medium ID with information that is to be written onto the recording medium is previously registered. The medium ID is read out from the recording medium, and information correlated with the medium ID is written onto the recording medium with using the index information. When the index information is previously registered in this way, information correlated with the medium ID of the recording medium is automatically written onto the recording medium simply by setting the recording medium into a writing section. Therefore, the user can always obtain adequate information without particularly designating information to be written onto the recording medium.

As the index information, the medium ID, and information specifying information which is to be written onto a recording medium, such as the kind and address of the information, and search conditions may be held. Based on the index information, in accordance with the information specifying information to be written which is registered in correspondence with the medium ID obtained from the recording medium by the writing section, for example, information may be selected or searched, so that the information to be written onto the recording medium is written by the writing section onto the recording medium. The writing section may receive the specifying information from the server, and then obtain the information to be written onto the recording medium in accordance with the specifying information. Alternatively, the server may send directly or indirectly the information to be written to the writing section.

When information is to be written onto a recording medium, advertisement information may be written together therewith. The advertisement information may be selected in accordance with, for example, the medium ID or the specifying information, so that adequate advertisement information can be provided to the user or effective advertisement can be distributed to the user.

On the basis of the medium ID obtained from the recording medium by the writing section, information relating to use of the recording medium may be accumulated. The accumulated information can be used for various purposes, and, for example, for selecting the advertisement information.

For example, a useful recording medium is an optical writing displaying medium. The system may be configured so that, when information is to be written, the information is optically written in the form of an image onto the optical writing displaying medium. In this case, information is converted into an image and then written onto the recording medium. When no countermeasure is taken, therefore, the information is hardly reused or reprocessed. As described above, the index information is stored to be used, whereby information written onto the recording medium can be easily reused and reprocessed.

The medium ID may be recorded in the form of a bar code, an RF-ID tag, or a non-contact IC. The medium ID may be integrated with the recording medium.

The system for writing information may be configured as a system using a network such as a LAN or the Internet.

BRIEF DESCRIPTION OF THE DRAWINGS

These and other objects and advantages of this invention will become more fully apparent from the following detailed description taken with the accompanying drawings in which.

DETAILED DESCRIPTION OF THE PREFERRED EMBODIMENTS

Figures 1, 2:
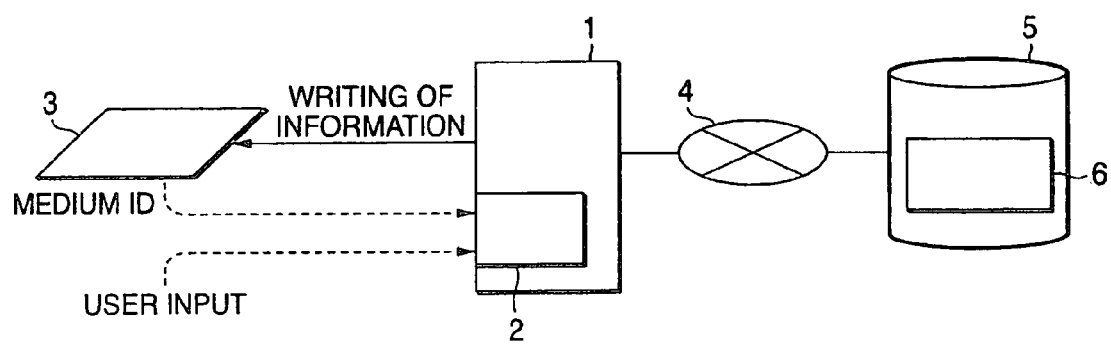
FIG. 1 is a block diagram showing a first embodiment of the system for writing information of the invention.
FIG. 2 is a view showing an example of index information 6 in the first embodiment of the system for writing information of the invention.

FIG. 1 is a block diagram showing a first embodiment of the system for writing information of the invention. Referring to the figure, 1 denotes a medium writing apparatus, 2 denotes an ID obtaining section, 3 denotes a recording medium, 4 denotes a network, 5 denotes a server, and 6 denotes index information. This example shows a configuration of a system in which the medium writing apparatus 1 and the server 5 can communicate with each other through the network 4. The network 4 is configured by arbitrary communication means such as a LAN, the Internet, or a dedicated communication line.

The medium writing apparatus 1 writes a whole or part of obtained information such as that which is obtained through the network 4, or a result of processing the information, onto the recording medium 3. In the case where an optical writing displaying medium is used as the recording medium 3 as described later, information to be written is converted into an image, and the image is optically written onto the recording medium 3. In the case of a recording medium of another type, it is a matter of course that a process adequate to the recording medium is performed as required, and information is written in accordance with a writing method according to the recording medium.

The medium writing apparatus 1 has the ID obtaining section 2 to obtain a medium ID identifying the recording medium 3 onto which information is to be written. In the case where a medium ID is recorded on the recording medium 3, the medium ID is read from the recording medium 3. The method of reading the medium ID is conducted in accordance with the method of recording the medium ID. When the medium ID is recorded in a memory in the recording medium 3, the ID is read electrically or electromagnetically. When the medium ID is recorded in the form of a bar code or characters, the ID is optically read. When the medium ID is magnetically recorded, the medium ID is obtained by magnetically reading the ID. Alternatively, the user may input the medium ID.

For example, the medium writing apparatus 1 may be configured as an independent apparatus, or by a computer connected to the network 4, a writing apparatus connected to the computer, etc.

The recording medium 3 may be of the any type as far as information can be written thereonto by the medium writing apparatus 1. In the embodiment, for example, the medium is an optical writing displaying medium. In an optical writing displaying medium, an image can be instantaneously written by display light of the image. In an operation of writing an image, a voltage is applied. After the writing operation is ended, however, the image which is once written can be kept to be displayed without a power supply. When an image is once written, therefore, the image can be always referred in the same manner as the case of a paper sheet which is conventionally used. The recording medium is a rewritable one. When written information becomes unnecessary, therefore, the medium can be reused by rewriting the information. Consequently, the optical writing displaying medium is a medium in an influence on the environment can be reduced. As the recording medium 3, any one of various writable cards including an IC card, a magnetic card, and a thermal write card may be used.

The recording medium 3 is provided with a medium ID so that the recording medium 3 can be identified. As described above, the medium ID can be recorded by any method. The recording method may be identical with or different from the method of recording information onto the recording medium 3. For example, the medium ID may be previously printed in the form of a bar code or characters, and the medium ID may be optically read, or input by the user. Alternatively, an RF-ID tag, a non-contact IC, or the like may be used as the medium ID. In the alternative, the RF-ID tag, the non-contact IC, or the like may be integrated with the recording medium 3.

The server 5 registers and holds the index information 6, and provides the index information on demand. The index information 6 is information in which, when information is written onto the recording medium 3 by the medium writing apparatus 1, the written information is correlated with the medium ID of the recording medium 3 onto which the information is written. FIG. 2 is a view showing an example of the index information 6 in the first embodiment of the system for writing information of the invention. This example is a simple one in which medium IDs are correlated with URLs indicating places of written information. The information indicating the place of information is not restricted to a URL. Alternatively, a file name may be used in place of the information indicating the place of information, or the information indicating the place of information may be the written information itself. Various kinds of other information such as the writing date and time, a protection password for restricting the use, and a search key which is useful in a search operation may be held as the index information 6, so that functions using the information are enabled. The medium ID, the written information, the information indicating the place of the written information, and other information may be transferred from the medium writing apparatus 1 through the network 4.

The server 5 may be configured so that, upon reception of the medium ID from the medium writing apparatus 1, the server performs authentication based on the medium ID. When such authentication is performed, a medium which can use the server 5 (store index information) can be restricted, and unauthorized access can be eliminated. In the authentication, only the medium ID may be used, or other information may be additionally used. For example, the server may receive an input of a password from the user, and then perform authentication with using the password together with the medium ID.

The server 5 may receive a reference request of the index information 6 identifying a medium ID from the computer (not shown) through the network 4, and return a whole or part of the index information 6 which is requested or has the medium ID. When the information written on the recording medium 3 is included in the index information 6, for example, the user receiving the index information can use the information. When the index information includes information indicating the place of information, the information may be accessed on the basis of the information indicating the place (an address such as a URL), so that the information written on the recording medium 3 can be obtained and used. Alternatively, the server 5 may specify information recorded on the recording medium 3 on the basis of the information indicating the place in the index information 6, and instruct a server which holds the information, to transfer it to the request source. The server 5 may once obtain the information and transfer it to the request source. In any case, on the basis of the medium ID, the request source can obtain the information written on the recording medium 3 of the medium ID. In the case where information is written as an image, as in the above-described case where an optical writing displaying medium is used as the recording medium 3, it is difficult to reconstruct the original written information from the recording medium 3. When the index information 6 is used as described above, however, the original information written on the recording medium 3 can be easily obtained, and reuse or reprocessing can be easily performed.

When the same recording medium 3 is reused several times, plural sets of index information 6 are held with using the same medium ID. In order to specify information, therefore, the server may be configured so that the user can select desired information from the one or plural sets of index information 6 identified by the medium ID. The history of writing information onto the single recording medium 3 is saved as the index information 6. Therefore, the history of rewriting may be used.

Figure 3:
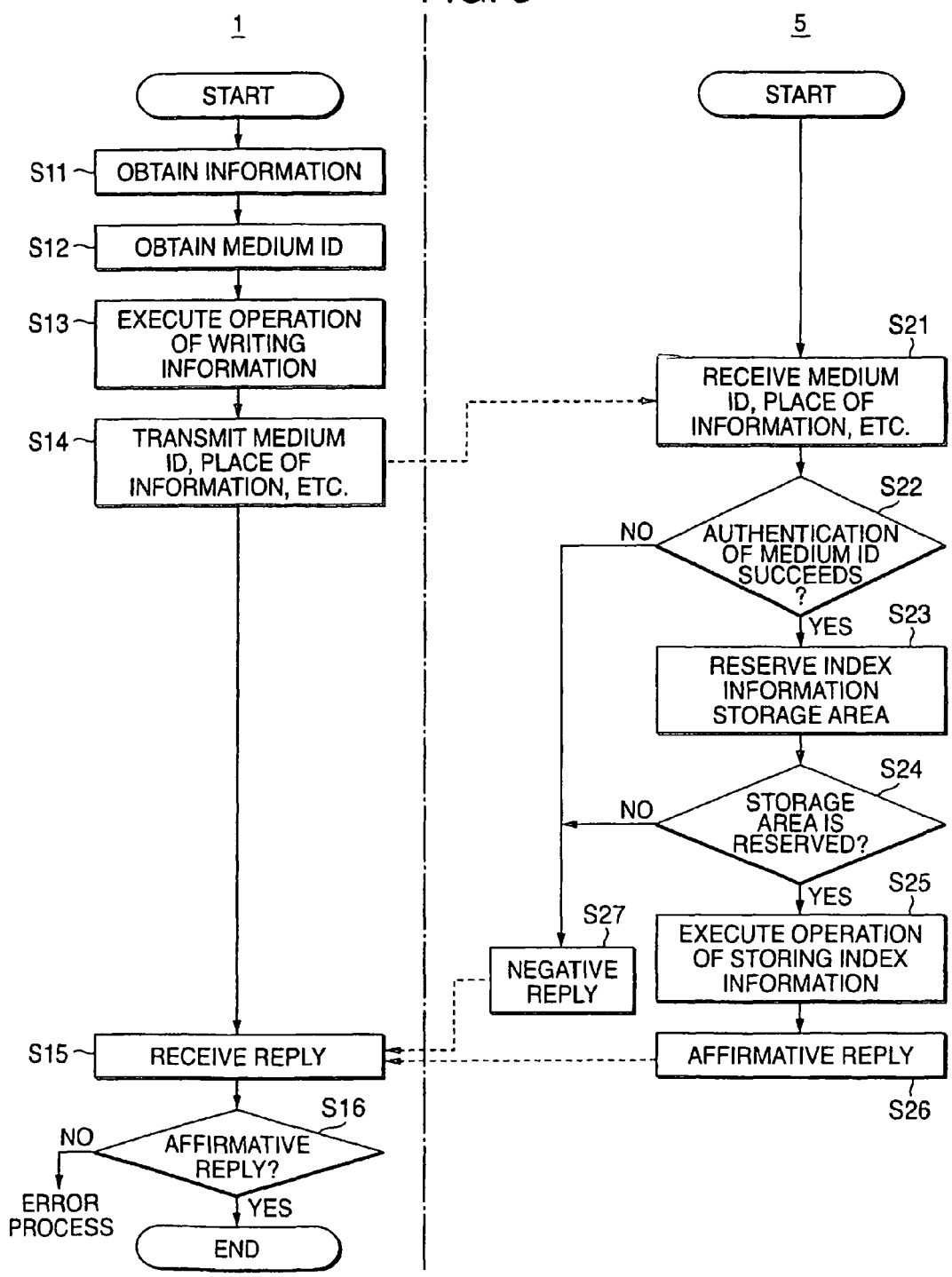
FIG. 3 is a flowchart showing an example of the operation of the first embodiment of the system for writing information of the invention.

FIG. 3 is a flowchart showing an example of the operation of the first embodiment of the system for writing information of the invention. In the medium writing apparatus 1, first, information to be written onto the recording medium 3 is obtained in S11 through the network 4. The method of obtaining information can be arbitrarily performed. For example, the user indicates the information, or conducts a search operation to obtain the information. Alternatively, the information may be obtained through the network 4, or may be produced by, for example, a computer including the medium writing apparatus 1.

When the information is obtained, the medium ID of the recording medium 3 onto which the information is to be written is obtained in S12. As described above, the medium ID can be obtained by any one of various methods in accordance with the method of recording the medium ID, such as an electric method, an electromagnetic method (including a radio wave method), a magnetic method, an optical method, or a method in which the user inputs the medium ID. When the medium ID cannot be obtained, a process may be performed so that the writing operation is not conducted or the communication with the server 5 is not performed so that index information is not saved.

In S13, the information which is obtained in S11 is written onto the recording medium 3. When the information is normally written, the medium ID which is obtained in S12, and the information itself which is written onto the recording medium 3, or information necessary for producing the index information 6 such as that indicating the place of the information are transmitted in S14 to the server 5. The process in the medium writing apparatus 1 may be ended without performing a further process. In the embodiment, however, a reply from the server 5 is waited in S15, and the reply from the server 5 is judged in S16. If the reply is affirmative, the process is normally ended, and, if the reply is negative, an error process is performed.

The server 5 receive in S21 the medium ID which is transmitted in the process of S14 in the medium writing apparatus 1, and the information itself which is written onto the recording medium 3, or the information necessary for producing the index information 6 such as that indicating the place of the information. Then, the server 5 performs in S22 authentication with using the medium ID. If the authentication succeeds, an area where the index information 6 is to be stored is reserved in S23. It is judged in S24 whether the area is reserved or not. If the area is reserved, the index information 6 is produced and stored in S25. At this time, as the index information 6, the medium ID and information indicating the place of an information file, a URL, or the like are correlated with each other. In the case where the information itself is to be stored, when only information indicating the place of the information is sent from the medium writing apparatus 1, the server 5 obtains the information, and the information at the timing can be ensured. After the index information 6 is stored, an affirmative reply is returned in S26 to the medium writing apparatus 1.

If the authentication of the medium ID in S22 fails, or if the storage area cannot be reserved in S24, a negative reply is returned in S27 to the medium writing apparatus 1.

The index information 6 which is stored in the server 5 in this way can be used with identifying the medium ID. The user requests the server 5 to obtain the index information 6 while designating the medium ID, from, for example, the computer (not shown) connected to the network 4. The medium ID can be designated by inputting the medium ID by the user, or with using an apparatus for reading a medium ID. The ID obtaining section 2 disposed in the medium writing apparatus 1 may be used.

In response to the request by the user, the server 5 searches the index information 6 correlated with the designated medium ID, and returns a list of the searched index information 6 to the user. The user can know the history of information written onto the recording medium 3, from the list of the index information 6, and as required obtain desired information so that the information can be reused or reprocessed to be reused. In the case where the index information 6 includes information indicating the place of the information, it is possible to obtain information which was written onto the recording medium 3 in the past, with using the information indicating the place.

Figures 4, 5:
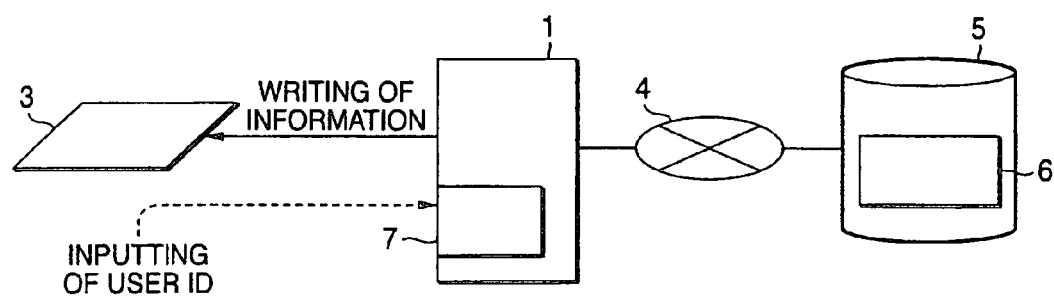
FIG. 4 is a block diagram showing a second embodiment of the system for writing information of the invention.
FIG. 5 is a view showing an example of index information 6 in the second embodiment of the system for writing information of the invention.

FIG. 4 is a block diagram showing a second embodiment of the system for writing information of the invention. In the figure, the components identical with those of FIG. 1 are denoted by the same reference numerals, and duplicated description is omitted. The reference numeral 7 denotes a user ID obtaining section. In the first embodiment described above, in the index information 6, the medium ID is correlated with the information or information indicating the place of the information. By contrast, in the second embodiment, the user is previously provided with a user ID, and the user ID is correlated with the information or information indicating the place of the information.

The medium writing apparatus 1 has the user ID obtaining section 7. When information is to be written onto the recording medium 3, the user ID obtaining section 7 obtains the user ID provided to the user. The user ID can be input by the user with using a keyboard or the like, or obtained with using a magnetic card or an IC card which is different from the recording medium 3. Alternatively, the apparatus is operated through a portable telephone, or authentication information is displayed on a display screen, and the displayed information is obtained as the user ID. The finger pattern, the voice pattern, or another physical feature characteristic of the user may be used.

On the basis of the user ID sent from the medium writing apparatus 1, the server 5 performs authentication, and stores the index information 6 while correlating the user ID with the information written on the recording medium 3 or information indicating the place of the information. FIG. 5 is a view showing an example of the index information 6 in the second embodiment of the system for writing information of the invention. This example is a simple one in which identified user names are correlated with URLs indicating places of information written on the recording medium 3. Of course, also this example can be variously modified in the same manner as the case of the first embodiment.

The server 5 may receive a reference request of the index information 6 identifying a user ID from the computer (not shown) through the network 4, perform authentication, and then return a whole or part of the requested index information 6 having the user ID.

Figure 6:
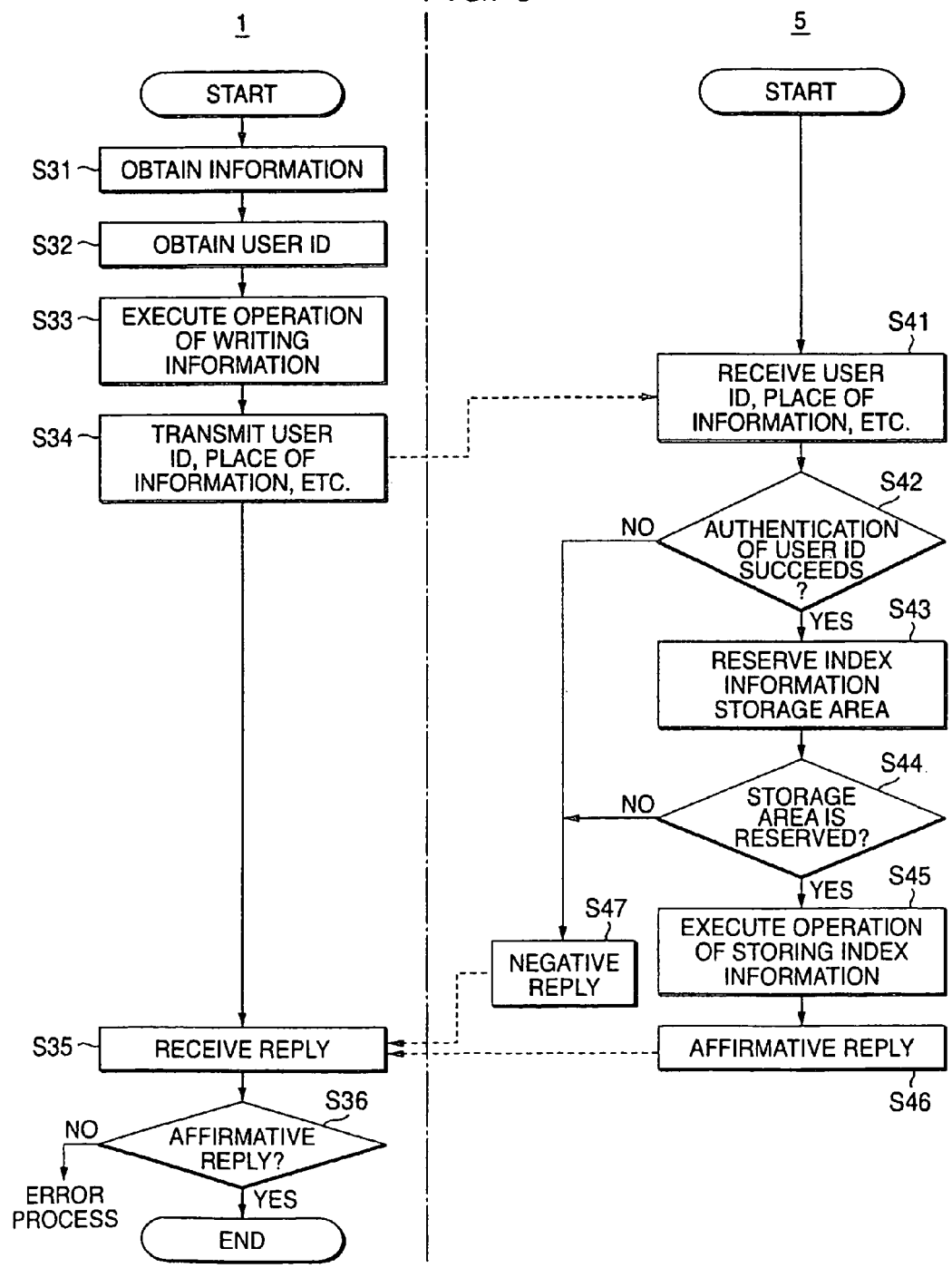
FIG. 6 is a flowchart showing an example of the operation of the second embodiment of the system for writing information of the invention.

FIG. 6 is a flowchart showing an example of the operation of the second embodiment of the system for writing information of the invention. The operation example of the second embodiment is basically different from the operation of the first embodiment shown in FIG. 3, only in that a user ID is used in the steps where the medium ID is used. Therefore, duplicated description is often omitted. It is a matter of course that also this example can be variously modified in the same manner as the example in the first embodiment.

In the medium writing apparatus 1, first, information to be written onto the recording medium 3 is obtained in S31. When the information is obtained, the user ID is obtained in S32 by the user ID obtaining section 7. As described above, the user ID can be obtained by any one of various methods. When the user ID cannot be obtained, a process may be performed so that the writing operation is not conducted or the communication with the server 5 is not performed so that index information is not saved.

In S33, the information which is obtained in S31 is written onto the recording medium 3. When the information is normally written, the user ID which is obtained in S32, and the information itself which is written onto the recording medium 3, or information necessary for producing the index information 6 such as that indicating the place of the information are transmitted in S34 to the server 5. The process in the medium writing apparatus 1 may be ended without performing a further process. In the embodiment, however, a reply from the server 5 is waited in S35, and the reply from the server 5 is judged in S36. If the reply is affirmative, the process is normally ended, and, if the reply is negative, an error process is performed.

The server 5 receive in S41 the user ID which is transmitted in the process of S34 in the medium writing apparatus 1, and the information itself which is written onto the recording medium 3, or the information necessary for producing the index information 6 such as that indicating the place of the information. Then, the server 5 performs in S42 authentication with using the user ID. If the authentication succeeds, an area where the index information 6 is to be stored is reserved in S43. It is judged in S44 whether the area is reserved or not. If the area is reserved, the index information 6 is produced and stored in S45. After the index information 6 is stored, an affirmative reply is returned in S46 to the medium writing apparatus 1. If the authentication of the user ID in S42 fails, or if the storage area cannot be reserved in S44, a negative reply is returned in S47 to the medium writing apparatus 1.

The index information 6 which is stored in the server 5 in this way can be used with identifying the user ID. The user requests the server 5 to obtain the index information 6 while designating the user ID, from, for example, the computer (not shown) connected to the network 4. In the designation of the user ID, the user ID obtaining section 7 or an apparatus similar to the user ID obtaining section 7 can be used.

In response to the request by the user, the server 5 searches the index information 6 correlated with the designated user ID, and returns a list of the index information 6 to the user. The user can know the history of information which was written onto the recording medium 3 by the user, from the list of the index information 6, and as required obtain desired information so that the information can be reused or reprocessed to be reused. The information can be obtained at the same time when, for example, the list of the index information 6 is obtained, or from the server 5 by designating one or plural sets of the index information 6 in the list. In the case where the index information 6 includes information indicating the place of the information, it is possible to obtain information with using the information indicating the place.

As described above, in the embodiment, the history of information which was written onto recording media 3 is managed for each user irrespective of the recording medium 3 on which information was written, so that history information respectively corresponding to users can be used.

The first and second embodiments may be combined with each other so that correlation with information or information indicating the place of the information can be performed with using the medium ID and the user ID.

The invention may be applied to various uses. An example of such applications will be described. In an office, for example, a recording medium such as an optical writing displaying medium is used in place of paper sheets, the history of information which was written onto the recording medium is stored as described above, and the written information can be reused.

In a point of production, for example, a recording medium such as an optical writing displaying medium may be used as a production instruction sheet which is to be attached to a part or a work in process to inform the worker of a working instruction. In this case, a working instruction for each step can be written onto a recording medium, and the work content in each step can be shown while updating the display contents. In the invention, each time a working instruction is written, the history is saved as index information. When the same recording medium is used in the whole process from assembling of parts and to the completion of a product, therefore, all the steps of the product can be saved as the history. When the thus saved index information is used, it is possible to perform the process management.

The recording medium may be used as a ticket for boarding a transportation facility such as a train. A conventional ticket made of paper is a throwaway one. When a recording medium such as an optical writing displaying medium which is rewritable is used as a ticket, the amount of waste material can be largely reduced, so that an influence on the environment can be suppressed. When a ticket is to be used, it is surely passed through ticket gates. In the case of boarding, therefore, information such as the date and the time is additionally written by a ticket gate, and index information is saved. In the case of disembarkation, the ticket is made void by another ticket gate, and, in the case of transfer, a guide to a transferred line is displayed, so that information on the ticket face is rewritten and index information is saved. When the index information is used, it is possible to manage passengers, and also to obtain accurate information relating to the volume of traffic and the like. Such information can be effectively used as data for future train service or management.

The recording medium may be used as a reward card which is widely used in a shop or a mall. Each time of shopping, information can be written, and the shopping history can be saved as index information. When the index information is referred at a later timing, it is possible to know the usage status of the reward card, i.e., the status of shopping, and hence the information is useful for future management. The customer can know the status of the own past shopping.

The recording medium may be used as a board which is employed in an event such as a stamp rally. Each time a racer passes a stamp point, information is written onto the medium, and the history is saved as index information. When the index information is referred at a later timing, it is possible to check passages of points and the passage sequence. It is a matter of course that the invention can be applied to various uses in addition to these application examples.

Figures 7, 8:
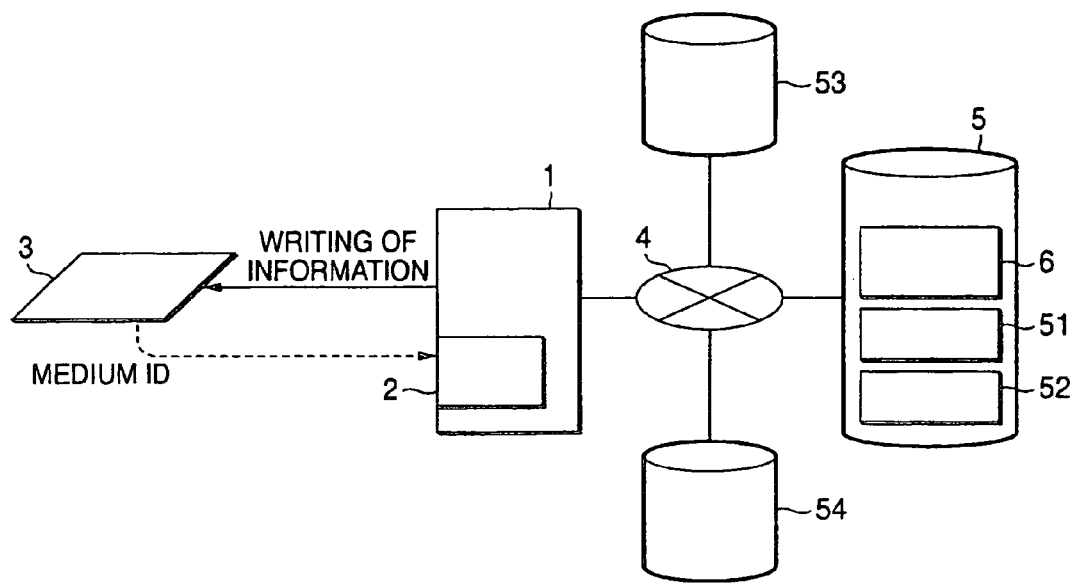
FIG. 7 is a block diagram showing a third embodiment of the system for writing information of the invention.
FIG. 8 is a view showing an example of index information 6 in the third embodiment of the system for writing information of the invention.

FIG. 7 is a block diagram showing a third embodiment of the system for writing information of the invention. In the figure, the components identical with those of FIG. 1 are denoted by the same reference numerals, and duplicated description is omitted. The reference numeral 51 denotes customer information, 52 denotes account information, 53 denotes a content distribution server, and 54 denotes an advertisement distributing server. In the embodiments described above, information for various purposes is recorded onto recording media. The kind of information to be recorded is determined by instructions of the user or the like. By contrast, the third embodiment is an example of a system in which information is previously registered, and information is written even when the user does not give instructions for specifying information in each operation of writing information.

FIG. 7 shows the configuration of the third embodiment. This configuration is basically identical with that shown in FIG. 1. The content distribution server 53 and the advertisement distributing server 54 are additionally shown in the figure, and the customer information 51 and the account information 52 are shown in the server 5. Of course, these components are arbitrarily disposed.

The content distribution server 53 stores information which is to be written onto the recording medium 3, and supplies information at a request of the server 5 or the medium writing apparatus 1. The advertisement distributing server 54 stores advertisement information which is to be written onto the recording medium 3, and supplies advertisement information at a request of the server 5 or the medium writing apparatus 1.

The customer information 51 includes personal information of the user of the recording medium 3, such as the name, the gender, the date of birth, the address, hobby/interest, and the blood type. The account information 52 includes a credit card number and expiration date, and permission to advertising.

In the third embodiment, the index information 6 includes specifying information which correlates a medium ID with information that is to written by the medium writing apparatus 1 onto a recording medium provided with the medium ID. The index information is previously registered. FIG. 8 is a view showing an example of the index information 6 in the third embodiment of the system for writing information of the invention. In this example, medium IDs are correlated with genres of contents as specifying information. For example, with respect to a recording medium of medium ID "12345", it is designated to write information specified by genre "NEWS (SPORTS)" which is registered correlatively with the recording medium. In this example, namely, information of latest sports news is written onto the recording medium.

It is a matter of course that the genres of information to be written which are correlated with medium IDs as specifying information may be other than those shown in FIG. 8. For example, it is possible to register various genres including: various kinds of news other than sports, such as economics, politics, society, and entertainment; weather forecast of districts other than Tokyo, in Japan or the world; information of stock, exchange, or commodity price; information of fortune or necromancy; sale or bargain information of a shop; education, quiz; trivia information; and information of game and amusement. Instead that information genres are registered, a search expression may be registered, or specific addresses or file names may be registered.

Using the index information 6, the customer information 51, the account information 52, and the like, the server 5 sends the specifying information which is registered in correspondence with the medium ID obtained from the recording medium 3 by the medium writing apparatus 1, to the medium writing apparatus 1, or, in accordance with the specifying information, supplies directly or indirectly the information to be written onto the recording medium 3, to the medium writing apparatus 1. At this time, with using the customer information 51 and the account information 52, the server can judge whether writing of information onto the recording medium 3 is allowed or not. Depending on the place where the medium writing apparatus 1 which sends the customer information 51 or the medium ID is placed or the time period, alternatively, advertisement information may be selected so as to be written onto the recording medium 3. In the alternative also, information specifying advertisement information may be sent to the medium writing apparatus 1, and the medium writing apparatus 1 may obtain the advertisement information, or advertisement information may be sent directly or indirectly to the medium writing apparatus 1. In the case where the account information 52 includes information relating to permission to advertising as described above, the server 5 or the medium writing apparatus 1 can judge based on the information whether the advertisement information is written onto the recording medium 3 or not.

In the third embodiment also, in the same manner as the first embodiment, the history of information written onto the recording medium 3 may be saved. The history information can be used for various purposes as described above. When advertisements are to be distributed, advertisements may be selected with using the history information.

An example of the operation of the third embodiment of the system for writing information of the invention will be described. First, as advance preparation, the index information 6, the customer information 51, the account information 52, and the like are registered. Specifically, the medium ID provided to the recording medium 3, and information specifying information which the user desires to be written onto the recording medium 3 are registered as the index information 6. The customer information 51 such as personal information of the user is registered. In the case where writing onto the recording medium 3 is to be charged, the account information 52 is registered. Of course, information other than the index information 6 is arbitrarily registered.

This advance registration may be performed by the operator, or by the user through the network 4. Alternatively, an operating section may be disposed on the medium writing apparatus 1, and the user may operate the operating section to perform the advance registration.

Figure 9:
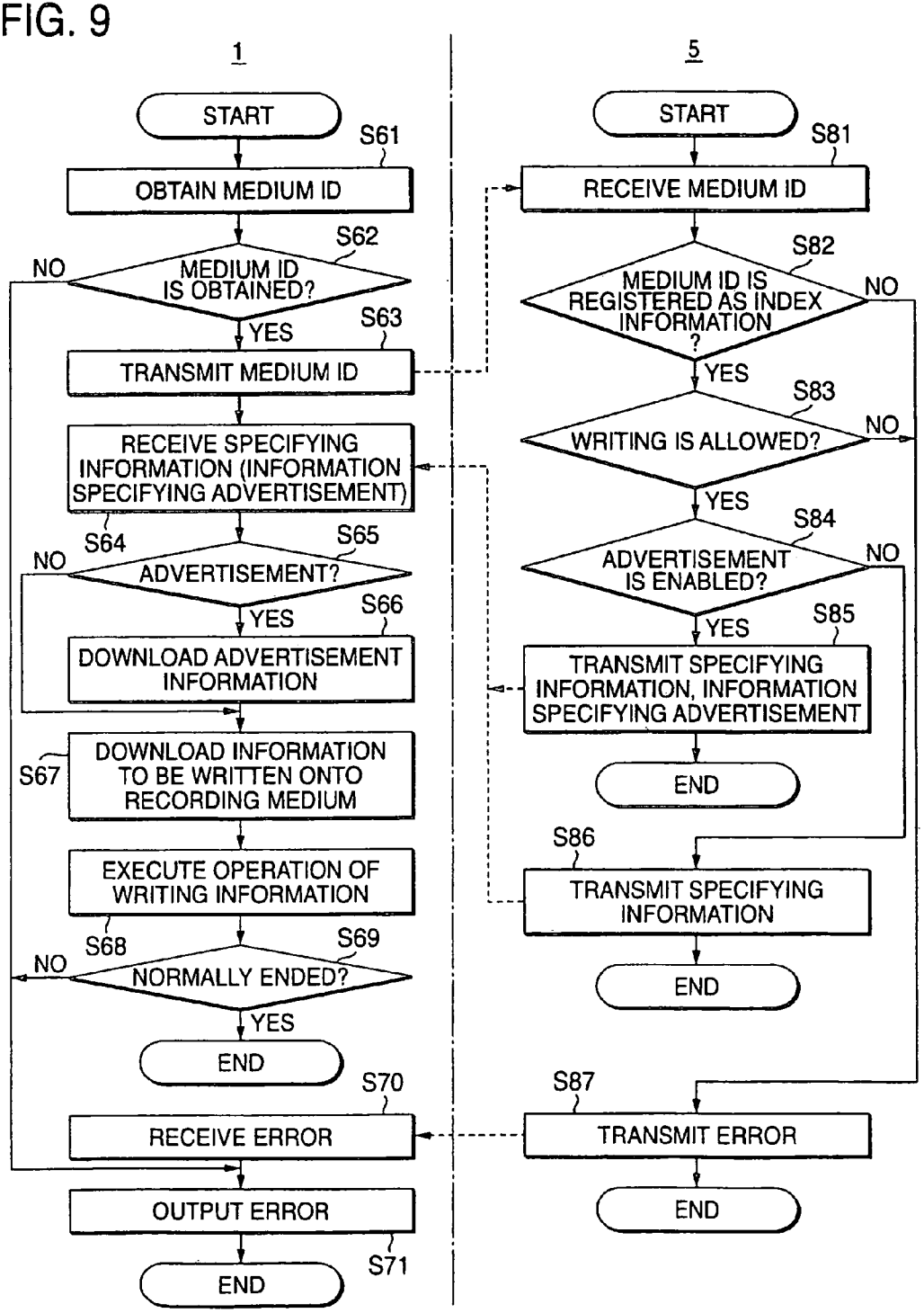
FIG. 9 is a flowchart showing an example of the process of writing information onto a recording medium 3 in the third embodiment of the system for writing information of the invention.

FIG. 9 is a flowchart showing an example of the process of writing information onto the recording medium 3 in the third embodiment of the system for writing information of the invention. When the recording medium 3 is presented to the medium writing apparatus 1, the medium writing apparatus 1 obtains in S61 the medium ID from the recording medium 3. It is judged in S62 whether the medium ID is obtained or not. If the medium ID is obtained, the medium ID is transmitted in S63 to the server 5. If the medium ID is not obtained, an error message is output in S71 and the process is ended.

The server 5 receives in S81 the medium ID sent from the medium writing apparatus 1. The server then judges in S82 whether the index information 6 corresponding to the received medium ID is registered or not. If the index information is registered, the server further judges in S83 whether information writing can be allowed or not, based on the customer information 51, the account information 52, and the like. If writing can be allowed, the server judges in S84 whether advertisement information is to be simultaneously written or not. If advertisement information is to be written, specifying information corresponding to the medium ID obtained from the index information 6, and information specifying advertisement are transmitted in S85 to the medium writing apparatus 1. If advertisement information is not to be written, the specifying information corresponding to the medium ID obtained from the index information 6 is transmitted in S86 without transmitting information specifying advertisement.

The specifying information may be transmitted to the medium writing apparatus 1 in the following manner. In the case where information genres are registered as in the example shown in FIG. 8, transmission may be performed after conversion into a specific information address. In the case where search conditions are registered, a search result may be transmitted. In this way, the registered contents themselves may be transmitted, or alternatively processed specifying information may be transmitted. With respect to information specifying advertisement, the server 5 may specify advertisement to be written onto the recording medium 3 and transmits the address of the specified advertisement, or alternatively the selection of advertisement may be performed by the medium writing apparatus 1 and the server may transmit information to be used in the selection.

The medium writing apparatus 1 receives in S64 the specifying information and the information specifying advertisement from the server 5. In S65, it is judged whether information specifying advertisement is received in S64 or not. If received, advertisement information is downloaded in S66 from the advertisement distributing server 54 on the basis of the information specifying advertisement. Irrespective of whether information specifying advertisement is received or not, information to be written onto the recording medium 3 is downloaded in S67 from the content distribution server 53 in accordance with the specifying information. In S68, the information which is downloaded in S67, and also the advertisement information which is downloaded in S66 are written onto the recording medium 3. It is judged in S69 whether the writing operation was normally conducted or not. If the writing operation was normally conducted the process is ended without performing a further process. If the writing operation was not normally conducted, an error message is output in S71 and the process is ended.

If the index information 6 corresponding to the received medium ID is not registered, or if it is judged that information writing cannot be allowed based on the customer information 51, the account information 52, and the like, the server 5 transmits in S87 an error to the medium writing apparatus 1. In the medium writing apparatus 1, when an error is returned from the server 5, the error is received in S70, an error message is output in S71, and the process is ended.

When advance registration is performed in this way, adequate information is always written onto the recording medium 3 even when the user does not conduct an operation of designating information. The writing process can be performed many times as far as writing is enabled as a result of the checking of account information, etc.

In a specific example, the user purchases the recording medium 3, and previously registers the medium ID and the genre of desired information, and as required personal information and payment information. At this time, also other information such as permission to advertising is registered. For example, management may be performed in the following manner. In the case where advertisement is to be written, the charge is reduced. The charge for information may be included in the purchase price of the recording medium 3.

It is assumed that the information genre is registered as "NEWS (SPORTS)" and permission to advertising is registered. When the user presents the purchased recording medium 3 to the medium writing apparatus 1, the medium writing apparatus 1 reads the medium ID and transfers the ID to the server 5. The server 5 judges whether the index information 6 is registered or not, on the basis of the medium ID of the presented recording medium 3, and also whether information can be written or not, on the basis of the account information 52, etc. For example, the apparatus can judge allowance of information writing, by, for example, checking that the number of a credit card for withdrawing the charge is registered, and that the expiration date of the recording medium 3 has not yet passed. In this example, if information is allowed to be written, specifying information corresponding to "NEWS (SPORTS)" is sent to the medium writing apparatus 1. Furthermore, advertisement which is desired by the user of the recording medium 3, or that which is effectively sent to the user is selected, and information specifying the advertisement is sent to the medium writing apparatus 1.

When specifying information corresponding to "NEWS (SPORTS)" and information specifying the advertisement are sent from the server 5, the medium writing apparatus 1 downloads information of "NEWS (SPORTS)" from the content distribution server 53 on the basis of the specifying information, and downloads advertisement information from the advertisement distributing server 54 on the basis of the information specifying advertisement. The information of "NEWS (SPORTS)" and the advertisement information are written onto the recording medium 3.

As a result, "NEWS (SPORTS)" and the advertisement are written onto the recording medium 3, and the user can obtain the information. When information of "NEWS (SPORTS)" to be stored into the content distribution server 53 is always updated and the server 5 transmits specifying information to the medium writing apparatus 1 so as to enable fetching of the current information of "NEWS (SPORTS)", the user can obtain sport information which is latest at the present time by presenting the recording medium 3 to the medium writing apparatus 1. In this case, even when the user does conduct an operation of selecting information, the user can always obtain latest information.

In the operation example shown in FIG. 9, the operation to be conducted after that of writing information onto the recording medium 3 is not described. After the operation of writing information onto the recording medium 3, for example, the server 5 is informed of the normal ending, and then accumulates the history in the same manner as the first embodiment. The accumulated history information can be used for various purposes, and, for example, in marketing or in the selection of advertisement information.

In the operation example described above, specifying information specifying information to be written onto the recording medium 3 (and that specifying advertisement) is sent to the medium writing apparatus 1, and the medium writing apparatus 1 downloads the information. The invention is not restricted to this. For example, the system may be configured in the following manner. The server 5 obtains information to be written onto the recording medium 3, in accordance with the specifying information, and also advertisement information, and then transfers the obtained information to the medium writing apparatus 1. Alternatively, the server 5 instructs the content distribution server 53 and the advertisement distributing server 54 to perform transmission to the medium writing apparatus 1, and the information to be written onto the recording medium 3, the advertisement information, and the like are transmitted from the content distribution server 53 and the advertisement distributing server 54 to the medium writing apparatus 1. Alternatively, the medium writing apparatus 1 previously downloads the information which is to be written onto the recording medium 3, the advertisement information, and the like, and, when the recording medium 3 is presented and information is to be written, downloading of the information is not performed. In this case, the turn-around time can be shortened, and the system load can be reduced.

In the configuration example shown in FIG. 7, the content distribution server 53 and the advertisement distributing server 54 are shown as separate servers. Alternatively, the servers may be integrated with the server 5, or the medium writing apparatus 1 may be provided with the functions of the content distribution server 53 and the advertisement distributing server 54. It is a matter of course that plural content distribution servers 53 and advertisement distributing servers 54 can exist.

As apparent from the above description, according to the invention, information can be recorded in real time onto a recording medium which has excellent portability, in which an influence on the environment is suppressed, and which can be rewritten many times, and index information correlating the information with a medium ID or a user ID can be held to be saved as the history.

The use of the index information provides an effect that, even when information is processed into that in the form of an image or the like and then written onto a recording medium, the recorded information can be obtained as digital information as required so as to be easily subjected to, for example, reprocessing or reuse. When the index information itself is used, statuses such as the usage status of each recording medium, and that of a recording medium by the user can be known, and the information can be used for various purposes.

Furthermore, the system can be configured so that index information is previously registered, and information to be written is specified in accordance with a medium ID of a recording medium and the specified information is written onto the recording medium. According to the configuration, when previously registered, adequate information can be always written onto the recording medium in a process of conducting a writing operation on the recording medium, even when the user does not conduct an operation of specifying information. The user can obtain necessary latest information. When specific information is displayed on a specific recording medium, the user can intuitively handle electronic information. Moreover, distribution of optimum advertisement can be realized. According to the invention, these various effects can be attained.

What is claimed is:

1. A system for writing information comprising:
  a writing section that writes information onto a rewritable recording medium, the rewritable recording medium having a medium identification (ID) identifying the rewritable recording medium; and
  a server that stores index information correlating the medium ID with the information that is written onto the rewritable recording medium by the writing section,
  wherein the rewritable recording medium is a displaying medium which displays an image according to the information in the index information, and the image once written on the displaying medium continues to be displayed without a supply of power.

2. A system for writing information comprising:
  a writing section that writes information onto a rewritable recording medium, the rewritable recording medium having a medium identification (ID) identifying the rewritable recording medium; and
  a server that stores index information correlating the medium ID with the information that is to be written onto the rewritable recording medium by the writing section, wherein the writing section writing the information correlated with the medium ID which is obtained from the rewritable recording medium, onto the rewritable recording medium,
  wherein the rewritable recording medium is a displaying medium which displays an image according to the information in the index information, and the image once written on the displaying medium continues to be displayed without a supply of power.

* * * * *